United States Patent [19]

Tsurumiya et al.

[11] Patent Number: 5,189,616
[45] Date of Patent: Feb. 23, 1993

[54] FOUR-WHEEL STEERING SYSTEM FOR MOTOR VEHICLE

[75] Inventors: Osamu Tsurumiya; Masataka Izawa; Masaru Abe; Ikuo Nonaga, all of Tochigi, Japan

[73] Assignee: Honda Giken Kogyo Kabushiki Kaisha, Tokyo, Japan

[21] Appl. No.: 616,408

[22] Filed: Nov. 21, 1990

[30] Foreign Application Priority Data

Nov. 22, 1989 [JP] Japan .................. 1-304234

[51] Int. Cl.⁵ .............................. B62D 6/02
[52] U.S. Cl. ...................... 364/424.05; 180/140; 180/142; 280/91
[58] Field of Search ............ 369/424.05; 180/79.1, 180/140, 141, 142, 143; 280/91

[56] References Cited

U.S. PATENT DOCUMENTS

| | | | |
|---|---|---|---|
| 4,657,102 | 4/1987 | Kanazawa et al. | 180/140 |
| 4,669,567 | 6/1987 | Nakamura et al. | 180/140 |
| 4,703,822 | 11/1987 | Kawamoto et al. | 180/140 |
| 4,719,981 | 1/1988 | Miyoshi | 180/140 |
| 4,730,839 | 3/1988 | Miyoshi | 180/143 |
| 4,819,170 | 4/1989 | Shimizu | 180/142 |
| 4,874,054 | 10/1989 | Watanabe | 180/140 |
| 4,958,698 | 9/1990 | Kirschner | 180/140 |
| 4,979,116 | 12/1990 | Takahashi | 180/140 |
| 5,083,627 | 1/1992 | Kawamoto et al. | 180/140 |
| 5,099,938 | 3/1992 | Watanabe et al. | 180/142 |

FOREIGN PATENT DOCUMENTS 59-77968  5/1984  Japan.

Primary Examiner—Gary Chin
Attorney, Agent, or Firm—Irving M. Weiner; Joseph P. Carrier; Pamela S. Burt

[57] ABSTRACT

A four-wheel steering system for a motor vehicle steers motor vehicle rear wheels based on a steering angle ratio between front and rear wheels based on a vehicle speed, and a front wheel steering angle. The steering angle ratio is of a negative value or a relatively small positive value when the vehicle speed is in a medium speed range or a high speed range and the front wheel steering angle is in a relatively small range. The motor vehicle is controlled to turn well when the front wheel steering angle is in the relative small range while the motor vehicle is running in the medium and high speed ranges.

4 Claims, 4 Drawing Sheets

FOUR-WHEEL STEERING SYSTEM FOR MOTOR VEHICLE

BACKGROUND OF THE INVENTION

1. Field of the Invention

The present invention relates to a steering system for a motor vehicle, and more particularly to a four-wheel steering system for a motor vehicle such as an automobile.

2. Description of Relevant Art

There are known various four-wheel steering systems for steering the front and rear wheels of motor vehicles.

Basically, in many four-wheel steering systems, the ratio (steering angle ratio) between a front wheel steering angle, i.e., the angle through which the front wheels are to be steered, and a rear wheel steering angle, i.e., the angle through which the rear wheels are to be steered, varies depending on the speed of travel of the motor vehicle, as disclosed in U.S. Pat. Nos. 4,703,822 and 4,730,839, for example. More specifically, these four-wheel steering systems make the steering angle ratio negative, i.e., steer the rear wheels in a direction opposite to the direction in which the front wheels are steered, in a low speed range, and make the steering angle ratio positive, i.e., steering the rear wheels in the same direction as the front wheels, in medium and high speed ranges. In the low speed range, since the turning behavior of the motor vehicle is mainly governed by the yawing acceleration, the motor vehicle can turn quite well as desired. In the medium and high speed ranges the motor vehicle can change lanes quickly because the turning behavior thereof is mainly governed by the lateral acceleration, which is greater as the motor vehicle runs faster.

Japanese Laid-Open Patent Publication No. 59-77968 published on May 4, 1984 discloses a four-wheel steering system which basically keeps the steering angle ratio positive. Specifically, the positive steering angle ratio increases as the motor vehicle speed increases. When the front wheel steering angle becomes greater than a predetermined value at each motor vehicle speed, the rear wheel steering angle is maintained at the predetermined value. The rear wheel steering angle maintained at the predetermined value is therefore an upper limit steering angle for the rear wheels at each motor vehicle speed. The predetermined value is selected such that it is smaller as the motor vehicle speed is lower. With the disclosed four-wheel steering system, inasmuch as the steering angle ratio increases as the motor vehicle speed goes higher, the turning response of the motor vehicle is improved when it changes lanes at medium and high speeds. The maneuverability of the motor vehicle is improved since the upper limit steering angle for the rear wheels increases as the motor vehicle speed increases.

Experiments conducted by the applicant have shown that the motor vehicle should turn well while the steering wheel angle is small in medium and high speed ranges, i.e., while the steering wheel is in the vicinity of its neutral position and the front wheel steering angle is small. Stated otherwise, during an initial phase of the steering action, the driver should preferably feel the yawing acceleration.

According to the four-wheel steering systems disclosed in the above two U.S. Patents, the rear wheels are steered in the same direction as the front wheels in the medium and high speed ranges. Therefore, the motor vehicle with these disclosed four-wheel steering systems cannot turn well in the medium and high speed ranges, irrespective of the magnitude of the steering wheel angle.

According to the four-wheel steering system disclosed in the above Japanese Laid-Open Patent Publication, when the front wheel steering angle exceeds the predetermined value in all of the vehicle speed ranges, the rear wheel steering angle, which is in the same direction as the front wheel steering angle, is kept at its upper limit that depends on the motor vehicle speed. Insofar as the front wheel steering angle is large, the turning motions of the motor vehicle are governed by the yawing acceleration, allowing the motor vehicle to turn well, regardless of the motor vehicle speed. However, while the front wheel steering angle is small, the motor vehicle cannot turn well regardless of the motor vehicle speed, because the rear wheels are turned in the same direction as the front wheels as described above.

The present invention has been made in an effort to improve the conventional four-wheel steering systems for motor vehicles.

SUMMARY OF THE INVENTION

It is an object of the present invention to provide a four-wheel steering system for a motor vehicle, which system basically retains the various advantages of the conventional four-wheel steering systems, and is additionally capable of allowing the motor vehicle to turn well while the steering wheel angle is small and the front wheel steering angle is small when the motor vehicle runs in medium and high speed ranges.

To achieve the above object, there is provided a four-wheel steering system for a motor vehicle, for determining a steering angle ratio between front and rear wheels of the motor vehicle based on a vehicle speed of the motor vehicle, calculating a target rear wheel steering angle from the steering angle ratio and a front wheel steering angle, and steering the rear wheels through the calculated target rear wheel steering angle, characterized in that when the vehicles in a vehicle speed range in which the steering angle ratio is positive and the front wheel steering angle is equal to or smaller than a preset steering angle, the front and rear wheels are given a steering angle ratio which is smaller than the steering angle ratio at the preset steering angle and which varies depending on the vehicle speed.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

Figure 1:
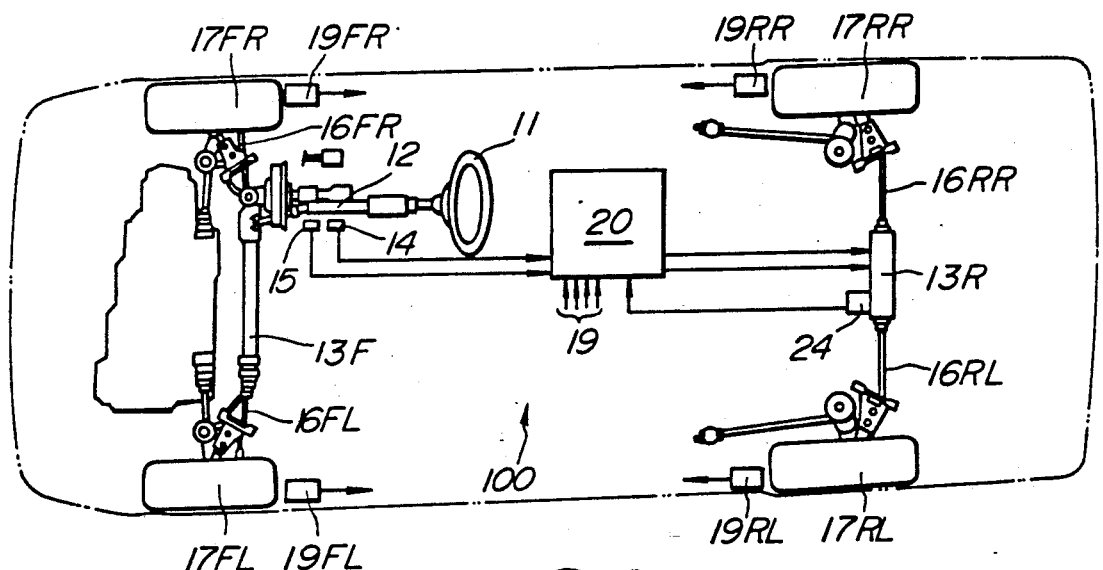
FIG. 1 is a schematic plan view of a mechanical arrangement of a four-wheel steering system for a motor vehicle according to a first embodiment of the present invention.

FIG. 1 schematically shows a four-wheel steering system, generally denoted at 100, according to a first embodiment of the present invention, incorporated in a motor vehicle such as an automobile.

As shown in FIG. 1, the motor vehicle has a steering wheel 11 operatively coupled through a steering shaft 12 to a rack-and-pinion steering gear mechanism which is accommodated in a front gear housing 13F. The steering shaft 12 rotatably extends through a column fixedly supported on a motor vehicle body (not shown), with a steering angle sensor 14 and a steering speed sensor 15 mounted on the column. The steering angle sensor 14 comprises an encoder for detecting the angle through which the steering shaft 12 is turned about its own axis by the steering wheel 11. The steering speed sensor 15 comprises a tachogenerator for detecting the angular velocity of the steering shaft 12 which is turned by the steering wheel 11. These sensors 14, 15 are electrically connected to a controller 20, and supply detected signals to the controller 20. The steering angle sensor 14, which detects the angle through which the steering shaft 12 is turned, serves to detect a steering angle $\theta f$ through which front wheels are steered. The steering speed sensor 15, which detects the angular velocity at which the steering shaft 12 is turned, serves to detect a steer speed $\dot{\theta}f$ at which the front wheels are steered. Therefore, these sensors 14, 15 will also be referred to as a front wheel steering angle sensor and a front wheel steering speed sensor, respectively.

The steering gear mechanism comprises a pinion (not shown) rotatable with the steering shaft 12 and a rack (not shown) extending in the transverse direction of the motor vehicle, the pinion and the rack being held in mesh with each other. The rack has its opposite ends coupled to the left and right front wheels 17FL, 17FR, respectively, through respective steering linkages such as tie rods 16FL, 16FR, so that any steering action or movement of the steering wheel 11 can be transmitted to the front wheels 17FL, 17FR. The front wheels 17FL, 17FR and rear wheels 17RL, 17RR are associated with respective vehicle speed sensors 19FL, 19FR, 19RL, 19RR (which will collectively be referred to as vehicle speed sensors 19). The vehicle speed sensors 19 are electrically connected to the controller 20. The sensors 14, 15 may be replaced with sensors for directly detecting the angle through and the angular velocity at which the front wheels 17FL, 17FR are steered.

A gear housing 13R is mounted on a rear portion of the motor vehicle body and houses a rear wheel steering mechanism (not shown). The rear wheel steering mechanism comprises a rod (not shown) supported in the housing 13R for axial sliding movement in the transverse direction of the motor vehicle, and an electric motor (not shown) also supported in the housing 13R for axially moving the rod. Axial displacements of the rod can be detected by a rear wheel steering angle sensor 24 mounted on the gear housing 13R. The rod has its opposite ends coupled to the left and right rear wheels 17RL, 17RR, respectively, through respective steering linkages such as tie rods 16RL, 16RR. The electric motor in the gear housing 13R and the rear wheel steering angle sensor 24 are electrically connected to the controller 20. The electric motor is energized by the controller 20 to axially move the rod, thereby steering the rear wheels 17RL, 17RR. Based on the axial displacement of the rod, the rear wheel steering angle sensor 24 detects a steering angle $\theta r$ at which the rear wheels 17RL, 17RR are steered, and applies a detected signal to the controller 20.

The controller 20 comprises a microcomputer, a motor driver, and other electric circuitry. The microcomputer is connected to the sensors 14, 15, 19, 24 and the motor driver is connected the electric motor of the rear wheel steering mechanism. The microcomputer processes the signals from the various sensors, detects the front wheel steering speed or angular velocity of and other parameters, and determines a target rear wheel steering angle $\theta rt$. Based on the target rear wheel steering angle $\theta rt$, the microcomputer also determines the direction in which the electric motor for steering the rear wheels 17RL, 17RR is to be energized and the duty factor for the electric motor, and applies a PWM (Pulse Width Modulation) signal, indicative of the determined direction and duty factor, to the motor driver. The motor driver comprises a bridge of FETs and energizes the electric motor according to the PWM signal from the microcomputer. The motor driver may be of the circuit arrangement disclosed in U.S. Pat. No. 4,819,170.

Operation of the four-wheel steering system 100 will now be described below with reference to FIG. 2.

Figure 2:
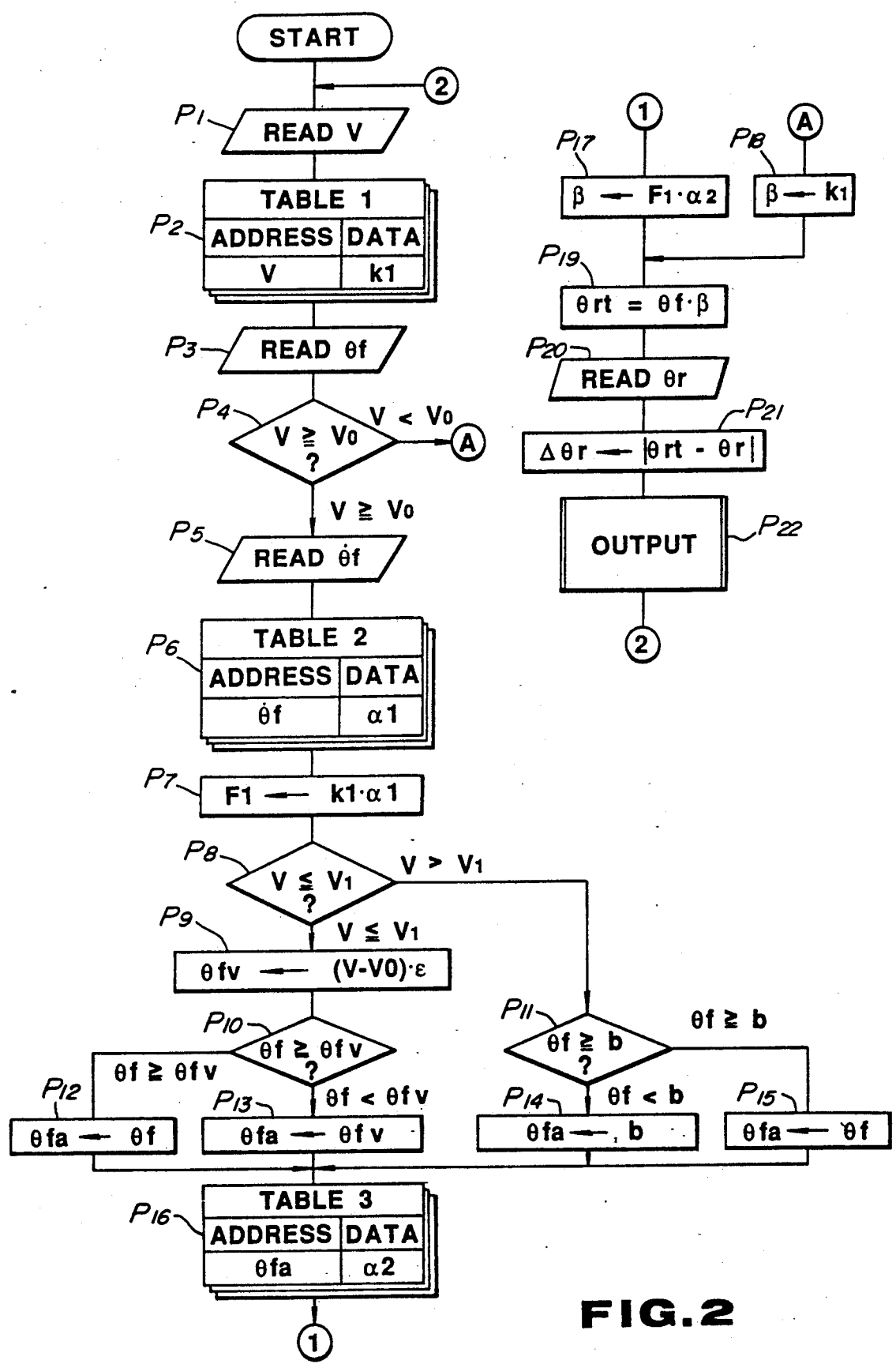
FIG. 2 is a flowchart of a control process which is carried out by the four-wheel steering system according to the first embodiment.

The microcomputer of the controller 20 executes a control process shown in FIG. 2, and controls the electric motor in the gear housing 13R, i.e., the steering movement of the rear wheels 17RL, 17RR.

Figure 3:
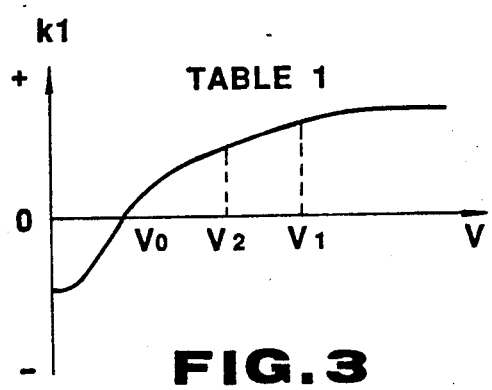
FIGS. 3 through 5 are diagrams showing various data tables employed in the control process shown in FIG. 2.

When the ignition switch of the motor vehicle is turned on, the controller 20 is energized by a battery and starts to operate. First, the controller 20 reads a vehicle speed V from the output signals from the vehicle speed sensors 19 in a step P1. Then, the microcomputer determines a basic steering angle ratio k1 for the rear wheel steering angle $\theta r$ with respect to the front wheel steering angle $\theta f$, from a data Table 1 (FIG. 3) stored in a ROM of the microcomputer, using the vehicle speed V as an address, in a step P2. As shown in FIG. 3, the Table 1 contains basic steering angle ratios k1 as a function of the vehicle speed V. The basic steering angle ratio k1 is of such characteristics that it is zero when the vehicle speed V is of a relatively small predetermined value V0, negative when the vehicle speed V is lower than the predetermined value V0 (V < V0), and positive when the vehicle speed V is higher than the predetermined value V0 (V0 < V). When the basic steering ratio k1 is positive, the rear wheels 17RL, 17RR are to be steered in the same direction as the front wheels 17FL, 17FR, and when the basic steering ratio k1 is negative, the rear wheels 17RL, 17RR are to be steered in the opposite direction to the front wheels 17FL, 17FR. The predetermined vehicle speed V0 may be V0=30 km/h, and predetermined vehicle speeds V1, V2 (described later on) may be V1=138 km/h and V2=87 km/h, for example.

In a next step P3, the microcomputer reads a front wheel steering angle $\theta f$ from the output signal from the steering wheel angle sensor 14. A step P4 determines whether the vehicle speed V is equal to or higher than the predetermined vehicle speed V0 or not. Since the basic steering angle ratio k1 changes its signs at the predetermined vehicle speed V0, the result of the decision step P4 also indicates the sign, positive or negative, of the basic steering angle ratio k1. If the vehicle speed V is lower than the predetermined vehicle speed V0, then the basic steering angle ratio k1 is used as a final steering angle ratio β in a step P18. If the vehicle speed V is equal to or higher than the predetermined vehicle speed V0, then a step P5 and following steps are executed.

Figure 4:
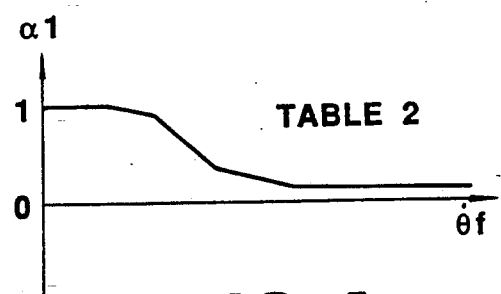

In the step P5, the microcomputer reads a front wheel steering angular velocity $\dot{\theta}f$ from the output signal from the sensor 15. Then, the microcomputer determines a first corrective coefficient α1 from a data table 2 (FIG. 4), using the front wheel steering angular velocity $\dot{\theta}f$ as an address, in a step P6. As shown in FIG. 4, the data table 2 contains first corrective coefficients α1 as a function of the steering angular velocity $\dot{\theta}f$. More specifically, the first corrective coefficient α1 has such characteristics that it is of a positive value equal to or smaller than 1, and it is of a value equal or close to 1 when the steering angular velocity $\dot{\theta}f$ is low, and becomes smaller as the steering angular velocity $\dot{\theta}f$ goes higher.

In a next step P7, the basic steering angle ratio k1 is multiplied by the first corrective coefficient α1, producing a temporary steering angle ratio F1. Since the first corrective coefficient α1 is substantially 1 when the steering angular velocity $\dot{\theta}f$ is low, the temporary steering angle ratio F1 is not virtually affected by the steering angular velocity $\dot{\theta}f$ and is equal to the basic steering angle ratio k1 if the steering angular velocity $\dot{\theta}f$ is low when the steering wheel is turned through a small angle. Therefore, if the steering angular velocity $\dot{\theta}f$ is low when the steering wheel is turned through a small angle, the steering characteristics of the motor vehicle are the same as those when the fundamental steering angle ratio k1 of the data table 1 is employed, with the result that the maneuverability of the motor vehicle is stable.

Thereafter, the microcomputer determines whether not the vehicle speed V is equal to or smaller than the relatively large predetermined value V1 in a next step P8. If the vehicle speed V is equal to or smaller than the predetermined speed V1, then control goes from the step P8 to a step P9. If the vehicle speed V is higher than the predetermined speed V1, then control goes from the step P8 to a step P11. Therefore, the step P8 determines a vehicle speed range in which the detected vehicle speed V falls.

From the steps P4, P8, it can be understood that the vehicle speed V satisfies the condition V0≦V≦V1 in the step P9. In the step P9, the difference V−V0 (≧0) between the vehicle speed V and the predetermined speed V0 is multiplied by a coefficient ε (=b/(V1−V0)), where b is a preset steering angle, producing a comparative reference steering angle θfv.

In a step P10, the microcomputer determines whether or not the actual front wheel steering angle θf is equal to or larger than the comparative reference steering angle θfv. If the actual front wheel steering angle θf is smaller than the comparative reference steering angle θfv, then the comparative reference steering angle θfv is employed as a nominal front wheel steering angle θfa for determining a corrective coefficient in a step P13. If the actual front wheel steering angle θf is equal to or larger than the comparative reference steering angle θfv, then the actual front wheel steering angle θf is employed as a nominal front wheel steering angle θfa in a step P12. Thereafter, control goes to a step P16. If the vehicle speed V is higher than the predetermined speed V1 in the step P8, then control goes to a step P11 which determines whether or not the actual front steering angle θf is equal to or larger than the preset steering angle b, which will be described later on with reference to FIG. 5. If the actual front wheel steering angle θf is smaller than preset steering angle b, then the preset steering angle b is employed as the nominal front wheel steering angle θfa in a step P14. If the actual front wheel steering angle θf is equal to or larger than the preset steering angle b, then the actual front wheel steering angle θf is employed as the nominal front wheel steering angle θfa in a step P15. Thereafter, control proceeds to the step P16.

Figure 5:
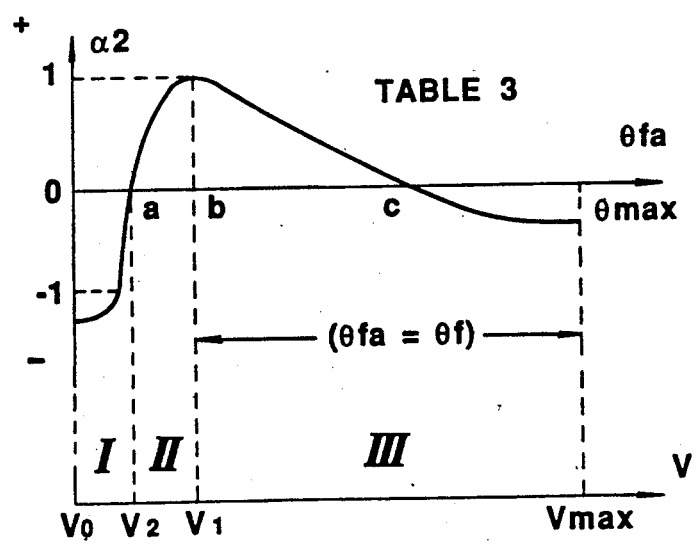

The step P16 determines a second corrective coefficient α2 from a data table 3 (FIG. 5), using as an address the nominal front wheel steering angle θfa that has been determined in one of the steps P12, P13, P14, P15. As shown in FIG. 5, the data Table 3 contains second corrective coefficients α2 as a function of the nominal front wheel steering angle θfa. More specifically, as the nominal front wheel steering angle θfa increases in its range smaller than the preset steering angle b, the second corrective coefficient α2 increases from a negative value through zero to a positive value, and reaches a maximum value of 1 when the nominal front wheel steering angle θfa becomes the preset steering angle b. As the nominal front wheel steering angle θfa becomes greater than the preset steering angle b, the second corrective coefficient α2 gradually decreases from the maximum value through zero to a negative value. In the vehicle speed range of V0≦V≦V1, the comparative reference steering angle θfv corresponds directly or bears a one-to-one correspondence to the vehicle speed V indicated on a lower horizontal axis in FIG. 5. For example, when the vehicle speed V is V0, V2, and V1, the comparative reference steering angle θfv is O, a, and b, respectively.

Figure 6:
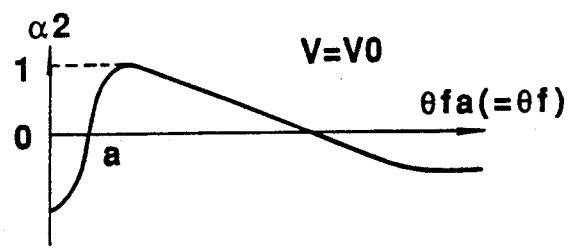
FIGS. 6 through 8 are diagrams showing the effective contents of the data table shown in FIG. 5.

Since the comparative reference steering speed θfv varies depending on the vehicle speed V in the vehicle speed range of V0≦V≦V1 (the steps P8 through P15), the effective contents of the data table 3 in the step P16 are as follows:

When the vehicle speed V is V=V0, since the comparative reference steering angle θfv is θfv=0, the nominal steering angle θfa is θfa=θf, and the data table 3 is used as it is as shown in FIG. 6. In the vehicle speed range of V0<V≦V1, when the actual front wheel steering angle θf is smaller than the comparative reference steering angle θfv that is determined depending on the vehicle speed V, the nominal steering angle θfa is θfa=θfv, and when the actual front wheel steering angle θf larger than the comparative reference steering angle θfv, the nominal steering angle θfa=θf. For example, in a vehicle speed range I of V0<V≦V2, if the actual front wheel steering angle θf is small, i.e., insofar as the actual front wheel steering angle θf smaller than the steering angle a (θf<a), the second corrective coefficient α2 is negative.

Figure 7:
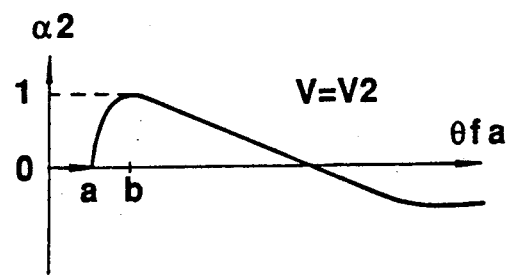
Figure 8:
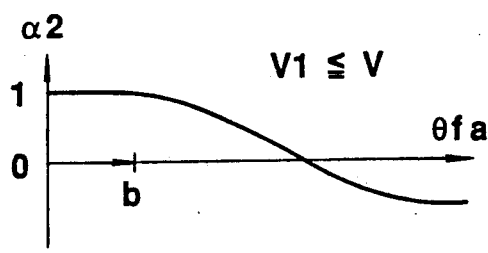

As shown in FIG. 7, when the vehicle speed V is V=V2, the comparative reference steering angle θfv is θfv=a. When the actual front wheel steering angle θf is small i.e., in the range of θf<θfv, the nominal steering angle θfa is θfa=a, and the second corrective coefficient α2 is zero. In a range II of V2<V≦V1, when the actual front wheel steering angle θf is small (θf<b), the second corrective coefficient α2 is positive. In a range III of V1≦V, since the nominal steering angle θfa is equal to or larger than the steering angle b, the second corrective coefficient $\alpha 2$ varies depending on the nominal steering angle $\theta fa$ as shown in FIG. 8.

In the steps P9 through P16, therefore, the second corrective coefficient $\alpha 2$ depending on the vehicle speed V and the actual front wheel steering angle $\theta f$ is determined on the basis of the single data Table 3.

In a next step P17, the temporary steering angle ratio F1 (k1.$\alpha$1) is multiplied by the second corrective coefficient $\alpha 2$, thereby determining a final steering angle ratio $\beta$. Then, the actual front wheel steering angle $\theta f$ is multiplied by the final steering angle ratio $\beta$, thus producing a target rear wheel steering angle $\theta rt$ in a step P19. Inasmuch as the second corrective coefficient $\alpha 2$ is determined depending on the vehicle speed V and the actual front wheel steering angle $\theta f$ in the range of $V0 \leq V$, the final steering angle ratio $\beta$ determined in the step P17 varies depending on the actual front wheel steering angle $\theta f$. More specifically, in the vehicle speed range I ($V0 \leq V < V2$), the final steering angle ratio $\beta$ is of a negative value because the second corrective coefficient $\alpha 2$ is negative in the vicinity of the front wheel neutral position ($\theta f < a$). In the vehicle speed range II ($V2 \leq V < V1$), the second corrective coefficient $\alpha 2$ is of a value smaller than 1 in the vicinity of the front wheel neutral position ($\theta f < b$). Since the final steering angle ratio $\beta$ is given as $\beta = F1.\beta 1 = k1.\alpha 1.\alpha 2$, the final steering angle ratio $\beta$ is smaller than the basic steering angle ratio k1 in the vehicle speed range II. As a result, in the vicinity of the front wheel neutral position ($\theta f < b$), the target rear wheel steering angle $\theta rt$ is set in the opposite direction to the front wheel steering angle, or in the same direction as the front wheel steering angle but of a small value. In the vehicle speed range of $V < V0$, control goes from the step P4 to the step P18, as described above, the basic steering angle ratio k1 is used directly as the final steering angle ratio $\beta$ which again is multiplied by the actual front wheel steering angle $\theta f$ to produce the target rear wheel steering angle $\theta rt$ in step P19.

In a step P20, the microcomputer reads an actual rear wheel steering angle $\theta r$ from the output signal from the rear wheel steering angle sensor 24. Then, the microcomputer calculates the difference $\Delta \theta r$ between the target rear wheel steering angle $\theta rt$ and the actual rear wheel steering angle $\theta r$, in a step P21. In a step P22, the electric motor in the gear housing 13R is energized on the basis of the difference $\Delta \theta r$. The rear wheels 17RL, 17RR are therefore steered through the target rear wheel steering angle $\theta rt$. Then, the control process is repeated again from the step P1.

In the four-wheel steering system 100, if the basic steering angle ratio k1 determined on the basis of the vehicle speed V is of a positive value ($V0 \leq V$), then the basic steering angle ratio k1 is corrected depending on the vehicle speed V and the actual front wheel steering angle $\theta f$. More specifically, if the vehicle speed is in the range of $V0 \leq V$, when the actual front wheel steering angle $\theta f$ is smaller than the preset steering angle b, i.e., when the front wheels are in the vicinity of the neutral position ($\theta f < b$) at the time the steering wheel 11 starts being turned, the basic steering angle ratio k1 is multiplied by a second corrective coefficient $\alpha 2$ which is of a negative value or a positive value smaller than 1. Therefore, the rear wheel steering angle in an initial steering phase in the medium vehicle speed range I and the high vehicle speed range II is more in the opposite direction to the front wheel steering angle than the rear wheel steering angle which is determined using the basic steering angle ratio k1 of the data Table 1 as it is. As a consequence, the four-wheel steering system 100 allows the motor vehicle to turn well in a small steering wheel angle in the medium and high vehicle speed ranges while basically retaining the various advantages of the conventional four-wheel steering systems.

The four-wheel steering system 100 according to the present invention permits the driver to have a good steering feeling since the characteristics of the second corrective coefficient $\alpha 2$ vary depending on the vehicle speed V. Because only one data table 3 is used to determine the second corrective coefficient $\alpha 2$ based on the vehicle speed V and the actual front wheel steering angle $\theta f$, the memory capacity which is required may be reduced and the control process is simplified. Furthermore, when the actual front wheel steering angle $\theta f$ is larger than the preset steering angle b, the characteristics of the second corrective coefficient $\alpha 2$ do not vary depending on the vehicle speed V, and hence the driver is allowed to have a steady steering feeling.

If the motor vehicle can be turned well intrinsically because of suitable suspension characteristics, the second corrective coefficient $\alpha 2$ may be of a small positive value, rather than a negative value, even if the actual front wheel steering angle $\theta f$ is small.

Figure 9:
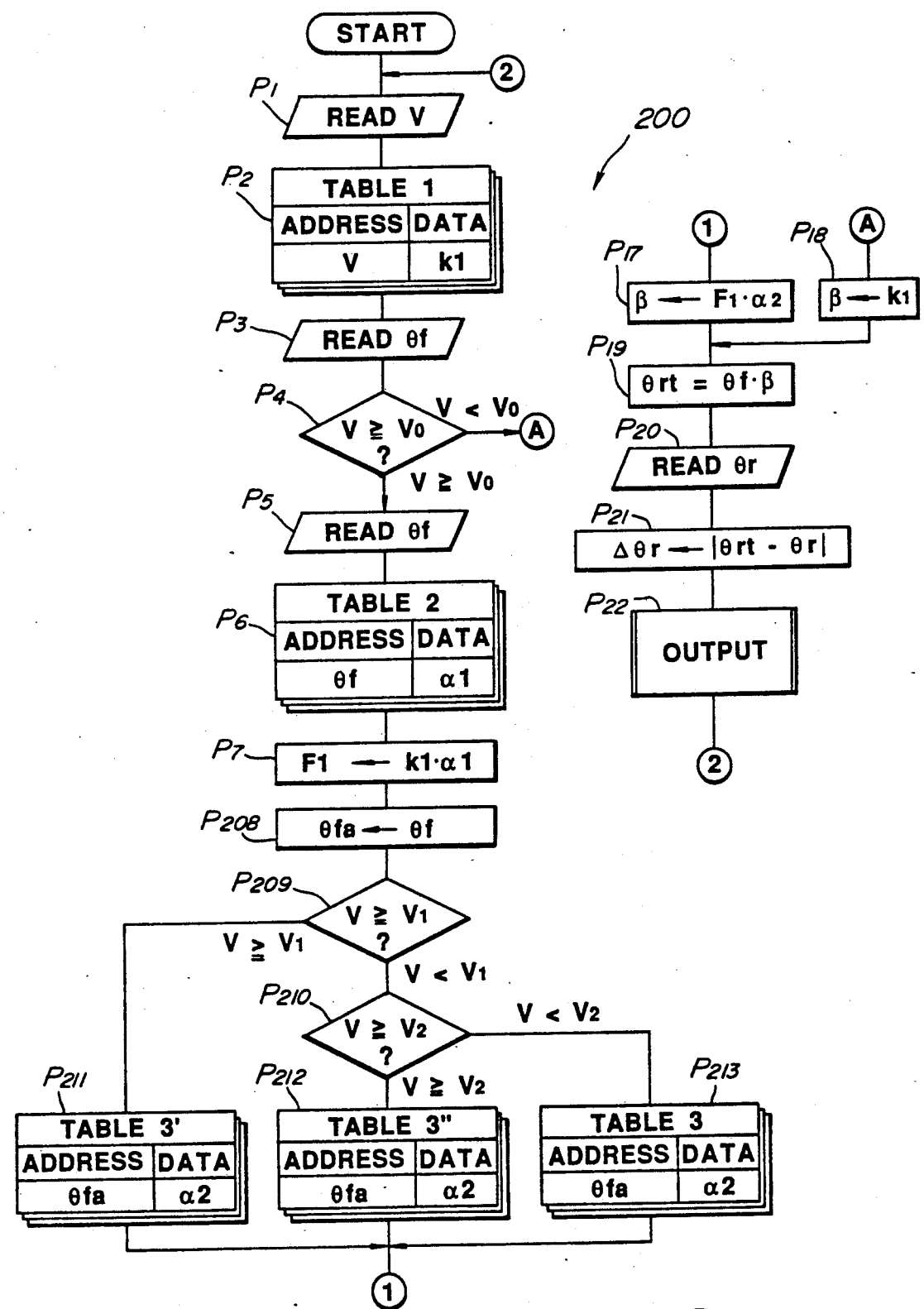
FIG. 9 is a flowchart of a control process which is carried out by a four-wheel steering system for a motor vehicle according to a second embodiment of the present invention.

FIG. 9 schematically shows a control process executed by a four-wheel steering system, generally denoted at 200, according to a second embodiment of the present invention. The mechanical and control systems of the four-wheel steering system 200 are identical to those of the four-wheel steering system 100 shown in FIG. 1, and will not be described in detail below.

The control process shown in FIG. 9 includes steps P1 through P7 and P17 through 22 which are identical to the corresponding steps in FIG. 2. Therefore, these steps will not be described below.

In a step P208, the actual front wheel steering angle $\theta f$ is employed as the nominal front wheel steering angle $\theta fa$ for determining a corrective coefficient. Then, a step P209 determines whether not the vehicle speed V is equal to or higher than the predetermined speed V1. If the vehicle speed V is equal to or higher than the predetermined speed V1, then control goes to a step P211. If the vehicle speed V is lower than the predetermined speed V1, then control goes to a step P210 which determines whether or not the vehicle speed V is equal to or higher than the predetermined speed V2. If the vehicle speed V is equal to or higher than the predetermined speed V2, then control goes to a step P212, and if the vehicle speed V is lower than the predetermined speed V2, then control goes to a step P213.

Figure 10:
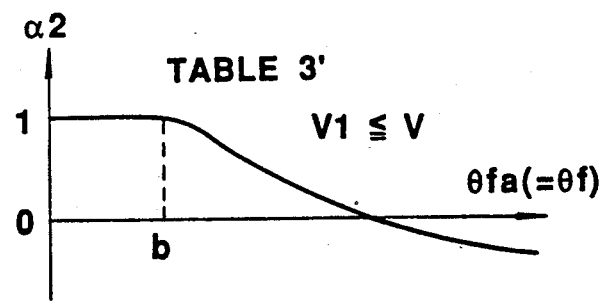
FIGS. 10 and 11 are diagrams showing additional data tables employed in the control process shown in FIG. 9.
Figure 11:
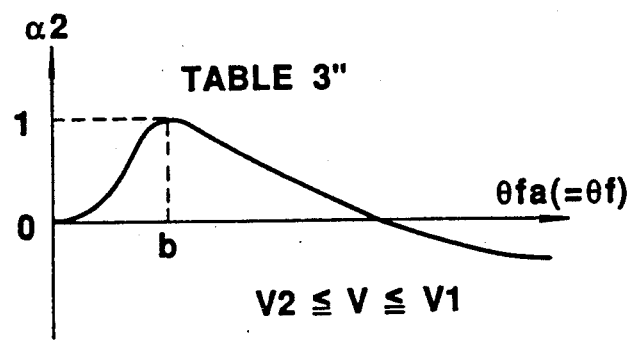

In the step P211, a second corrective coefficient $\alpha 2$ is addressed in a data Table 3' (FIG. 10) by the nominal steering angle $\theta fa$. In the step P212, a second corrective coefficient $\alpha 2$ is addressed in a data Table 3" (FIG. 11) by the nominal steering angle $\theta fa$. In the step P213, a second corrective coefficient $\alpha 2$ is addressed in the data Table 3 (FIG. 5) by the nominal steering angle $\theta fa$, as is the case with the step P16 shown in FIG. 2. After either one of the steps P211, P212, and P213, the same control sequence as that shown in FIG. 2 is carried out.

With the four-wheel steering system 200, as with the four-wheel steering system 100, in the vehicle speed range of $V0 \leq V$, when the actual front wheel steering angle $\theta f$ is smaller than the preset steering angle b, i.e., when the front wheels are in the vicinity of the neutral position ($\theta f < b$) at the time the steering wheel 11 starts being turned, the basic steering angle ratio k1 is multiplied by a second corrective coefficient α2 which is of a negative value or a positive value smaller than 1. Therefore, the four-wheel steering system 200 also allows the motor vehicle to turn well in a small steering wheel angle in the medium and high vehicle speed ranges while basically retaining the various advantages of the conventional four-wheel steering systems.

Furthermore, the four-wheel steering system 200 is effective to carry out a finer control sequence because the second corrective coefficient α2 is determined using different data tables for different vehicle speed ranges. In addition, according to the four-wheel steering system 200, the steps P8 through P15 shown in FIG. 2, including the multiplication step P9, are replaced with a smaller number of steps P208 through P210 for simpler calculations, and hence the speed at which the control process shown in FIG. 9 is executed is increased.

Although there have been described what are at present considered to be the preferred embodiments of the present invention, it will be understood that the invention may be embodied in other specific forms without departing from the essential characteristics thereof. The present embodiments are therefore to be considered in all aspects as illustrative, and not restrictive. The scope of the invention is indicated by the appended claims rather than by the foregoing description.

We claim:

1. A four-wheel steering system for a motor vehicle, comprising:

means for determining a steering angle ratio between front and rear wheels of the motor vehicle based on a vehicle speed of the motor vehicle, means for calculating a target rear wheel steering angle from the steering angle ratio and a front wheel steering angle, and means for steering the rear wheels through the calculated target rear wheel steering angle, said steering angle ratio determining means including means for determining a basic steering angle based on said vehicle speed of the motor vehicle and means for modifying said basic steering angle ratio when the vehicle is in a vehicle speed range in which the basic steering angle ratio sets the rear wheel steering angle in the same direction as the front wheel steering angle and the front wheel steering angle is equal to or smaller than a preset steering angle such that the front and rear wheels are given a steering angle ratio which is smaller than the basic steering angle ratio at the preset steering angle and varies depending on the vehicle speed.

2. A four-wheel steering system for a motor-vehicle having a steering wheel, front wheels steerable by the steering wheel, and rear wheels steerable through a target rear wheel angle which depends on a front wheel steering angle of the front wheel and an actual vehicle speed of the motor vehicle, said four-wheel steering system comprising:

means for detecting the actual vehicle speed of the motor vehicle;

means for detecting the front wheel steering angle;

means for determining a basic steering angle ratio based on the actual vehicle speed and the front wheel steering angle;

said basic steering angle ratio being of such characteristics that the basic steering angle ratio is of a negative value when the vehicle speed is lower than a first predetermined vehicle speed of a relatively small value, and of a positive value when the vehicle speed is higher than said first predetermined vehicle speed;

means for determining a corrective coefficient when said basic steering angle ratio is of a positive value; said corrective coefficient being of a value smaller than 1, including zero and a negative value, when the front wheel steering angle is in a relatively small range;

means for determining a final steering angle ratio based on said basic steering angle ratio when the actual vehicle speed is lower than said first predetermined vehicle speed, and for determining a final steering angle ratio based on said basic steering angle ratio and said corrective coefficient when the actual vehicle speed is higher than said first predetermined vehicle speed;

means for determining the target rear wheel steering angle from the final steering angle ratio thus determined and the front wheel steering angle; and means for steering the rear wheels through said target rear wheel steering angle.

3. A four-wheel steering system according to claim 2, wherein said means for determining a corrective coefficient comprises:

comparative reference steering angle determining means for determining a comparative reference steering angle proportional to the difference between the actual vehicle speed and said first predetermined vehicle speed when the actual vehicle speed is lower than a second predetermined vehicle speed of a relatively large value;

said comparative reference steering angle being zero when the actual vehicle speed is equal to said first predetermined vehicle speed and being of a relatively small predetermined value when the actual vehicle speed is equal to said second predetermined vehicle speed;

nominal front wheel steering angle determining means for selecting a larger one of the comparative reference steering angle and the actual front wheel steering angle as a nominal front wheel steering angle when the actual vehicle speed is lower than said second predetermined vehicle speed, and for selecting a larger one of said relatively small predetermined value and the actual front wheel steering angle as a nominal front wheel steering angle when the actual vehicle speed is higher than said second predetermined vehicle speed; and corrective coefficient reading means for reading the corrective coefficient from a single data table with the nominal front wheel steering angle thus determined being used as an address.

4. A four-wheel steering system according to claim 2, wherein said means for determining a corrective coefficient comprises:

setting means for setting a third predetermined vehicle speed having a value between said first predetermined vehicle speed and said second predetermined vehicle speed;

data table selecting means for selecting a first data table when the actual vehicle speed is higher than said second predetermined vehicle speed, a second data table when the actual vehicle speed is between said third predetermined vehicle speed and said second predetermined vehicle speed, and a third data table when the actual vehicle speed is between said first predetermined vehicle speed and said third predetermined vehicle speed;

said first, second, and third data tables being representative of said corrective coefficient with respect to the front wheel steering angle;

said first data table being arranged such that said corrective coefficient is of a value of 1 when the front wheel steering angle is smaller than a predetermined steering angle of a relatively small value;

said second data table being arranged such that said corrective coefficient increases from zero to 1 when the front wheel steering angle increase from zero to said predetermined steering angle;

said third data table being arranged such that said corrective coefficient increases from a negative value through zero to 1 when the front wheel steering angle increases from zero to said predetermined steering angle; and corrective coefficient reading means for reading the corrective coefficient from the selected data table with the front wheel steering angle being used as an address.

* * * * *

UNITED STATES PATENT AND TRADEMARK OFFICE
CERTIFICATE OF CORRECTION

PATENT NO. : 5,189,616
DATED : February 23, 1993
INVENTOR(S) : Tsurumiya et al.

It is certified that error appears in the above-identified patent and that said Letters Patent is hereby corrected as shown below:

On the title page, item [54]:

In the Title, please change "VEHICLE" to --VEHICLES--.

Column 1, line 3, change "VEHICLE" to --VEHICLES--.

Column 4, line 16, change "of" to --$\dot{\theta}$f--.

Column 5, line 11, change "$\ddot{\theta}$f" to --$\dot{\theta}$f--;
Column 5, line 14, change "θf" to --$\dot{\theta}$f--;
Column 5, line 17, change "$\ddot{\theta}$f" to --$\dot{\theta}$f--;
Column 5, line 21, change "$\ddot{\theta}$f" to --$\dot{\theta}$f--;
Column 5, line 22, change "θf" to --$\dot{\theta}$f--;
Column 5, line 28, change "$\ddot{\theta}$f" to --$\dot{\theta}$f--;
Column 5, line 30, change "$\ddot{\theta}$f" to --$\dot{\theta}$f--;
Column 5, line 31, change "$\ddot{\theta}$f" to --$\dot{\theta}$f--;
Column 5, line 33, change "θf" to --$\dot{\theta}$f--.

Column 7, line 27, change "$\beta = F1.\beta1$" to --$\beta = F1.\alpha1$--;
Column 7, line 37, change "$\beta$which" to --$\beta$, which--.

UNITED STATES PATENT AND TRADEMARK OFFICE
CERTIFICATE OF CORRECTION

PATENT NO. : 5,189,616

DATED : Februray 23, 1993

INVENTOR(S) : Tsurumiya et al

It is certified that error appears in the above-identified patent and that said Letters Patent is hereby corrected as shown below:

Column 9, line 40 (claim 1, line 12), after "angle" insert --ratio--.

Signed and Sealed this

Thirtieth Day of November, 1993

Attest:

BRUCE LEHMAN

Attesting Officer

Commissioner of Patents and Trademarks